United States Patent Office 3,527,903
Patented Sept. 8, 1970

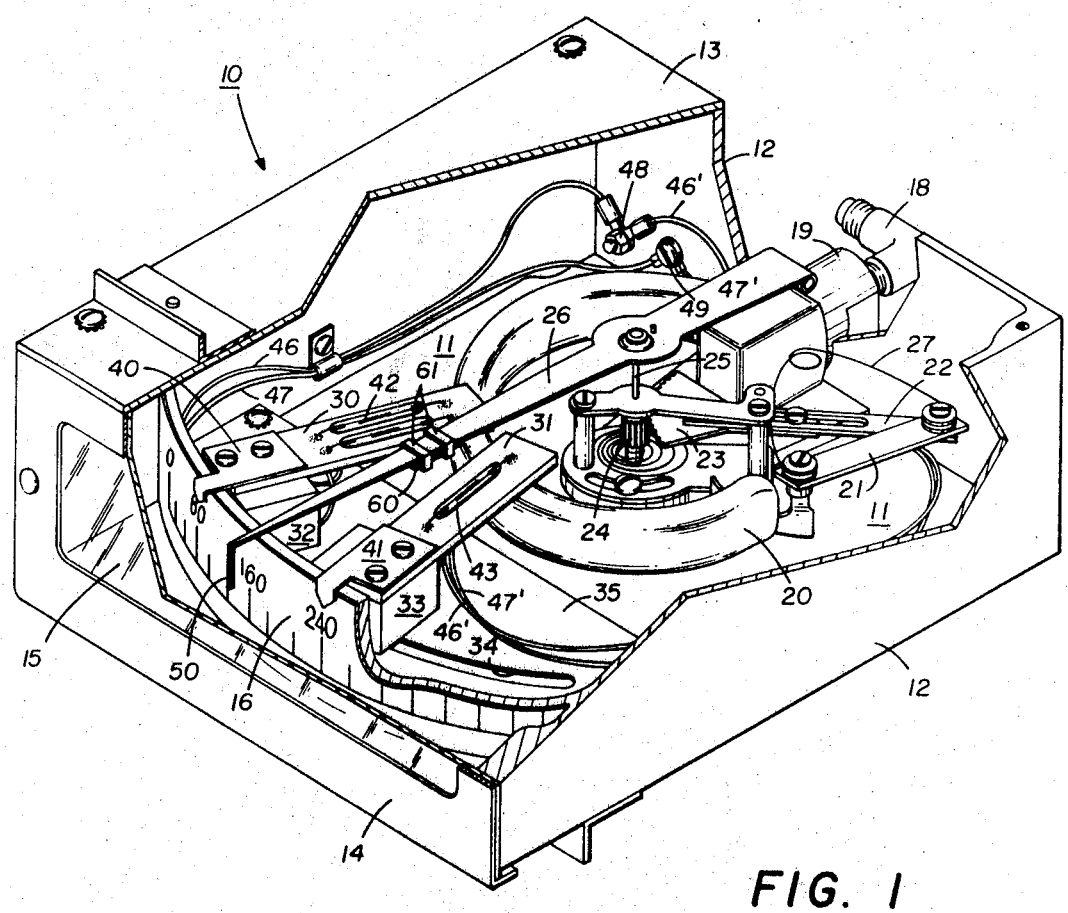

3,527,903
COMBINATION GAUGE SWITCH
Jack C. Holland, 9810 Lakemere, and Kenneth E. McNeill, 11336 Buchanan, both of Dallas, Tex. 75228
Filed July 15, 1968, Ser. No. 744,760
Int. Cl. G01d 13/26
U.S. Cl. 200—56                    3 Claims

ABSTRACT OF THE DISCLOSURE

A gauge/switch combination utilizes a transducer for converting sensed conditions as pressure to rotary mechanical motion which causes a pivotably mounted pointer to rotate over a pair of magnetically operated switches mounted on a pair of pre-positioned spaced apart cantilever beams, the activation and deactivation of the switches controlling apparatus associated therewith.

---

This invention pertains to switches, more particularly to a combination switch and gauge, and even more particularly to a novel switch and gauge for measuring and responding to pressure changes.

Within the field of controls and control type devices, there is a great demand for highly reliable and accurate safety switches which can be incorporated with machinery or apparatus of the type that is left unattended for large durations of time. For example, in the oil industry, internal combustion engines and air or gas compressors are often placed in the field to operate continuously without the constant supervision of an operator.

The difficulty with this arrangement, however, is that variations in conditions within the engine or compressor often require that the machinery be strictly controlled or even stopped to avoid permanent damage thereto. For example, increases in oil or water temperature above a prescribed level, excessive engine speed, or undesirable operating pressures, either too high or too low, demand that the operation of the machinery be slowed or even stopped until these conditions can be remedied. When the machinery is under constant supervision, this control may be effected by the operator monitoring these conditions, but an effective automatic safety instrument responsive to these changes must be employed when the engine or compressor is unattended.

Various types of instruments have been designed by others in response to this need. For example, a gauge/switch combination has been proposed utilizing a pivotally mounted pointer having contact mounted thereupon which makes direct physical connection to corresponding contacts located at high and low pressure points on the face of the gauge. This direct mechanical contact thus closes an electrical circuit and shuts off the machinery. Among the difficulties associated with this approach is the fact that environmental conditions cause corrosion and wear of these contacts, thus making the switch unreliable.

It is therefore a primary object of the present invention to provide a new and improved switch which is highly reliable and accurate.

It is another object of the invention to provide a combination switch and gauge which monitors and responds to changes in conditions within the apparatus to be controlled and acts as a control switch therefor.

It is a further object of the invention to furnish an automatic switch for various types of machinery where the switch halts the equiment when the operating pressure drops below or rises above certain prescribed limits.

It is a still further object of the invention to provide a combination pressure gauge/switch free of contact wear In accordance with these and other objects, the present invention, briefly stated, is embodied in a combination gauge/switch which includes means for translating detected external conditions such as pressures, temperatures, etc. of the apparatus to be controlled into rotary mechanical motion. The preferred embodiment utilizes a bourdon tube in cooperation with suitable linkage and gears to translate detected operating pressure changes into rotary motion, this rotary motion being transmitted to a pivotally mounted pointer which then rotates in a plane generally parallel to the base of the switch housing and perpendicular to a scale having incremental indicia thereupon. The pointer is adapted to rotate over a pair of pre-positioned spaced apart cantilever beams supporting magnetically activated (reed type) switches. A magnet affixed to the pointer respectively activates these switches as it moves in proximity thereto.

Additional features of the invention, as well as its operation and advantages thereof, are thoroughly covered in the following detailed description taken in conjunction with the accompanying drawings, wherein:

FIG. 1 is a pictorial view of the preferred embodiment of the combination gauge switch of the invention with portions of the housing removed; and FIG. 2 is a schematic representation of one method of utilizing the embodiment illustrated in FIG. 1.

Referring now to FIG. 1, a preferred embodiment of the combination gauge switch of the present invention is indicated generally by the reference numeral 10. The instrument 10 includes a housing 12 having a base portion 11, a removable cover portion 13, and a removable front piece portion 14. If desired, the back and side walls and base portion 11 may be formed of a single piece of metal, for example, conventional thumbscrews securing the removable covering 13 and front portion 14 to the remainder of the housing 11.

A channel for conveying the desired information of the various conditions within the apparatus to be controlled (not shown) extends through the housing 12, and is coupled to translating means for converting changes in these conditions to rotary mechanical motion. For example, the channel may be a wire transmitting engine temperature, or a shaft conveying motor speed information. In accordance with the preferred embodiment of the invention, however, the channel is a fluid pressure conduit 18 conveying the operating pressure of a compressor, and is threadably connected to a compartment or housing 19 which, in turn, is coupled to a bourdon tube 20.

A linkage arrangemetnt including a connecting arm 21 and a slotted extension arm 22 couples the bourdon tube 20 to a rack 23 and pinion gear 24 which, in turn, is coupled by way of shaft 25 to a pointer 26. Consequently, the expansion and contraction of the tube 20 in response to corresponding increases and decreases of pressure within the conduit 18 is translated to rotary mechanical motion causing the pointer 26 to rotate in a counter clockwise and clockwise direction, respectively. The angle between the arm 21 and the arm 22 is determined by the length of arm 22 and governs the full scale angle subtended by the pointer 26. A torsion spring 27 provides additional tension for the linkage connections.

A scale 16 disposed generally perpendicular to the base portion 11 has a suitable number of incremental pressure marks or indicia thereupon, and may be observed through a transparent window 15 of the front portion 14. An end portion 50 of the pointer 26 indicates the existing operating pressure, for example, and overhangs the top of the scale 16 as illustrated.

Immediately behind the scale 16 is a plate 35 spaced from and secured by screws to the base portion 11. A slot 34 is formed within the plate 35, and support blocks 32 and 33 are adapted to slide within this slot. In accordance with a specific feature of construction, the slot 34 is parallel to the scale 16. As illustrated in the specific embodiment of FIG. 1, therefore the arc provided by the slot 34 is concentric with the arc of the scale 16.

A pair of beams 30 and 31 are securely attached at their respective one ends to support blocks 32 and 33, their respective free ends cantilevered over the bourdon tube 20, as illustrated. Limit indicators or pointers 40 and 41 terminating in arrow portions are also securely attached to blocks 32 and 33, respectively, over the ends of the beams 30 and 31. As subsequently described, the pointers 40 and 41 indicate the values of the pressure limits established by the pre-positioning of the beams 30 and 31.

Mounted upon and supported by the free ends of the cantilevered beams 30 and 31 are magnetically activated switch means designated generally at 42 and 43, respectively. Each of the beams may support one such switch, as for example beam 31; or may support two or more paralleled switches, as for example beam 30. These magnetically activated switches may be of the type generally referred to as reed type switches, and comprise a pair of contacts which separate ("open") or come together ("close") in response to a magnetic force exerted thereupon. The contacts are ordinarily hermetically sealed in a dry inert gas, which avoids their contamination or corrosion by the environment. These reed switches may either be of the "normally open" or "normally closed" variety, and are presently commercially available.

The activation (either opening or closing) of the switches 42 and 43 is effected by a magnet 60 held to the underside of the pointer 26 by straps 61. In accordance with the operation of the gauge-switch 10, as described below, the rotation of the pointer 26 over the beams 30 and 31 activates either the switch 42 or the switch 43 as the magnet 60 moves in proximity thereto to effect the desired control.

While the gauge-switch combination of the present invention may be utilized in many type applications and in conjunction with various types of apparatus to be controlled, the operation of the invention is presently described in conjunction with an ignition system of an internal combustion engine. Accordingly, an ignition system 70 is connected in parallel, as illustrated schematically in FIG. 2. Lead wires 46 and 46' are respectively connected to ends of reed switches 42 and 43 and terminate at the common location 48, while lead wires 47 and 47' extend from the other ends of switches 42 and 43, respectively, and terminate at the common ground point 49.

The spaced cantilever beams 30 and 31 (and associated limit indicators 40 and 41) are adjusted within the slot 34 to establish the operating pressure limits of the controlled engine. For example, as illustrated in FIG. 1, the low pressure shut-down point is set at 80 p.s.i., while the high pressure shut down point is set at 240 p.s.i. As long as the pressure within the engine (and within the conduit 18) remains between these limits, the switches 42 and 43 remain in their normally open position, and the engine continues to operate.

On the other hand, if the pressure should decrease below the 80 p.s.i. point, the pointer 26 rotates accordingly over the beam 30, and the force established by the magnet 60 closes switch 42, thus grounding the ignition system 70, and stopping the engine. Two or more paralleled reeds are employed to assure that the switch 42 remains closed (within the field of the magnetic force as the pressure drops to zero. In a similar manner, an increase of pressure above the high pressure point of 240 p.s.i. rotates the pointer 26 over the beam 41, the magnet 60 thereby closing switch 43, grounds the ignition system 70, and stopping the engine until the pressure falls within the acceptable operating range. A suitable by-pass or timing device may be utilized in initially starting the engine until the lubricant pressure builds up to the 80 p.s.i. level.

As previously mentioned, various applications of the instant invention may be employed. For example, it may be desired to connect the reed switches 42 and 43 in series and/or utilize them in their normally closed positions depending upon the associated circuitry and apparatus to be controlled. Various other modifications or embodiments of the present invention may become obvious to those ordinarily skilled in the art without departing from the spirit and scope of the invention as defined by the appended claims:

What is claimed is:
1. A combination gauge and limit switch comprising:
 (a) a housing including a base portion and a substantially transparent front piece generally perpendicular to said base portion;
 (b) scale means having incremental indicia and supported generally perpendicularly to said base portion adjacent said transparent front piece and visible through said transparent front piece;
 (c) a support plate affixed to said base portion of said housing in a plane generally parallel to said base portion and having a slot formed therein, said slot following an arc concentric with an arc of said scale means;
 (d) a pair of spaced-apart cantilevered beams affixed to supports adapted to slide separately within said slot, said beams being located in a plane generally parallel to said base portion, one end of each of said beams terminating in a pointer adjacent said scale means;
 (e) at least one magnetically operated reed type switch mounted upon each of said beams;
 (f) pressure conduit means for transmitting varied pressure conditions to said housing,
 (g) a pointer mounted for rotary motion in a plane substantially parallel to said base portion, said pointer mounted to pass over said cantilevered beams and terminating adjacent said scale means, said pointer supported on a shaft carrying a pinion;
 (h) sensing and translation means coupled to said conduit means for translating the pressure changes in said conduit means to rotary mechanical motion, said sensing and translating means including a bourdon tube, a pair of interconnected arms coupling the end of said bourdon tube with a rack operatively engaging said pinion for translating expansion and contraction of said bourdon tube to relative rotary motion, the length of one of said arms and the angle between the two arms being adjustable to limit the rotation of said pinion; and
 (i) a magnet supported on said pointer between said scale means and said shaft whereby said rotary motion of said pinion causes said pointer to rotate and move said magnet in proximity with at least one of said reed type switches.

2. The combination gauge and limit switch defined in claim 1 wherein said reed type switches are interconnected with the ignition system of an internal combustion engine and are activated to ground said ignition system by said magnet being placed in proximity thereto.

3. The combination gauge and limit switch defined in claim 2 wherein at least one of said cantilevered beams supports at least two reed type switches positioned adjacent each other and electrically interconnected in parallel.

References Cited

UNITED STATES PATENTS 3,056,865 10/1962 Reardon et al. _____ 200—56
3,225,622 12/1965 Du Bois et al. _____ 200—56

HERMAN O. JONES, Primary Examiner

U.S. Cl. X.R.

123—198; 335—206